United States Patent [19]

Takayoshi

[11] Patent Number: 5,407,308
[45] Date of Patent: Apr. 18, 1995

[54] TOOL HOLDER COUPLING APPARATUS

[75] Inventor: Kitamura Takayoshi, Takaoka, Japan

[73] Assignee: Kitamura Machinery Co., Ltd., Japan

[21] Appl. No.: 84,275

[22] PCT Filed: Nov. 20, 1992

[86] PCT No.: PCT/JP92/01517

§ 371 Date: Jul. 8, 1993

§ 102(e) Date: Jul. 8, 1993

[87] PCT Pub. No.: WO93/10942

PCT Pub. Date: Jun. 10, 1993

[30] Foreign Application Priority Data

Dec. 4, 1991 [JP] Japan ................ 3-347697

[51] Int. Cl.⁶ .......................................... B23B 31/117
[52] U.S. Cl. ..................... 409/232; 279/103; 409/234
[58] Field of Search ............... 279/103; 409/232, 234, 409/233; 408/239 R, 239 A

[56] References Cited

U.S. PATENT DOCUMENTS

| | | | |
|---|---|---|---|
| 2,084,801 | 6/1937 | Hall | 409/233 |
| 3,554,080 | 1/1971 | Herrmann | 409/234 |
| 3,759,536 | 9/1973 | Bronzoni | 279/103 |
| 4,604,010 | 8/1986 | Reeves | 409/233 |
| 4,726,721 | 2/1988 | Heel et al. | 409/233 |
| 4,772,163 | 9/1988 | Scheer et al. | 409/234 X |
| 4,856,349 | 8/1989 | Huser | 409/234 |

FOREIGN PATENT DOCUMENTS

| | | | |
|---|---|---|---|
| 4004150 | 9/1990 | Germany | 409/232 |
| 3916315 | 11/1990 | Germany | 409/234 |
| 51108 | 12/1976 | Japan | |
| 04842 | 8/1986 | WIPO | |

*Primary Examiner*—Steven C. Bishop
*Attorney, Agent, or Firm*—Lorusso & Loud

[57] ABSTRACT

A tool holder coupling apparatus for attaching a tool holder to a machine spindle, has a tool holder which includes a support portion and a pull stud bolt. The support portion has a tapered surface portion of relatively large diameters, a straight portion of a relatively small diameter near the pull stud bolt, and a relief portion between the taper portion and the straight portion. The machine spindle of the coupling apparatus has a hollow interior defined by a tapered reception interior surface portion corresponding to the tapered surface portion of the tool holder, a straight interior surface portion corresponding to the straight surface portion of the tool holder, and a middle interior surface portion between the tapered surface portion and the straight surface portion. The tool holder attaches to the machine spindle in such a manner that the relief surface portion of the tool holder is spaced from the middle surface portion of the machine spindle.

9 Claims, 2 Drawing Sheets

TOOL HOLDER COUPLING APPARATUS

TECHNICAL FIELD

This invention relates to a tool holder coupling apparatus for attaching a tool holder to a machine spindle.

BACKGROUND

A tool holder normally includes a tool, a tapered portion and a pull stud bolt. When the tool holder is attached to a machine spindle, the pull stud bolt is drawn inwardly by way of a collet chuck in preloading. The tapered portion of the conventional tool holder is defined by a single continuous smooth tapered surface. An opening for receiving the taper portion of the tool holder is formed on the machine spindle. The opening in the machine spindle is defined by a single continuous smooth tapered surface. The tool holder is attached to the machine spindle in such a manner that the tapered portion of the tool holder is engaged with the corresponding tapered surface of the reception opening of the spindle over its entire length.

Nowadays a workpiece to be machined is often made of aluminum, non-ferrous metal containing resins, hard alloys and so on. These materials require high speed cutting or very high speed cutting. Even when a normal metal workpiece is machined, high speed cutting is desirable for accurate machining.

When the tool holder attached to the machine spindle is driven at high rate of rotation, the outer (entry) area of the tapered reception opening of the spindle is enlarged, e.g. by few micron meters. As a result, only the smaller diameter (end) area of the tapered support portion of the tool holder is engaged with the interior surface of the spindle, therefore play of the tool sometimes occurs during machining. Such play in the tool is allowed by the small clearance formed at the large diameter area (end) of the spindle opening. Because the small diameter area is hardly enlarged, the tool holder is supported by only the small diameter end of the support portion. It is hard to machine a workpiece with high accuracy if such tool play occurs. The play will also shorten the tool life. Moreover, severe cutting conditions must be avoided because of the play, to the detriment of productivity.

SUMMARY OF THE INVENTION

An object of the invention is to overcome the above-stated problems of the prior art and provide a tool holder coupling apparatus wherein no play of the tool holder (or tool) occurs even when driven at a high rate of rotation so that high accuracy machining can be performed.

The invention provides a tool holder coupling apparatus for attaching a tool holder to a machine spindle, wherein the tool holder includes a support portion for engaging the interior surface of the spindle and a pull stud bolt. The support portion includes a tapered surface portion of large diameters, a straight surface portion of a small diameter near the pull stud bolt, and a relief surface portion between the tapered surface portion and the straight surface portion. The machine spindle includes a central opening defined by a tapered interior surface portion corresponding to the tapered surface portion of the tool holder, a straight portion corresponding to the straight portion of the tool holder, and a middle portion between the tapered surface portion and the surface portion. The tool holder attaches to the machine spindle in such a manner that the relief portion of the tool holder is spaced from the middle surface portion of the machine spindle.

DETAILED DESCRIPTION OF THE PREFERRED EMBODIMENTS

Embodiments according to the invention will be explained with reference to the drawings.

Figure 1:
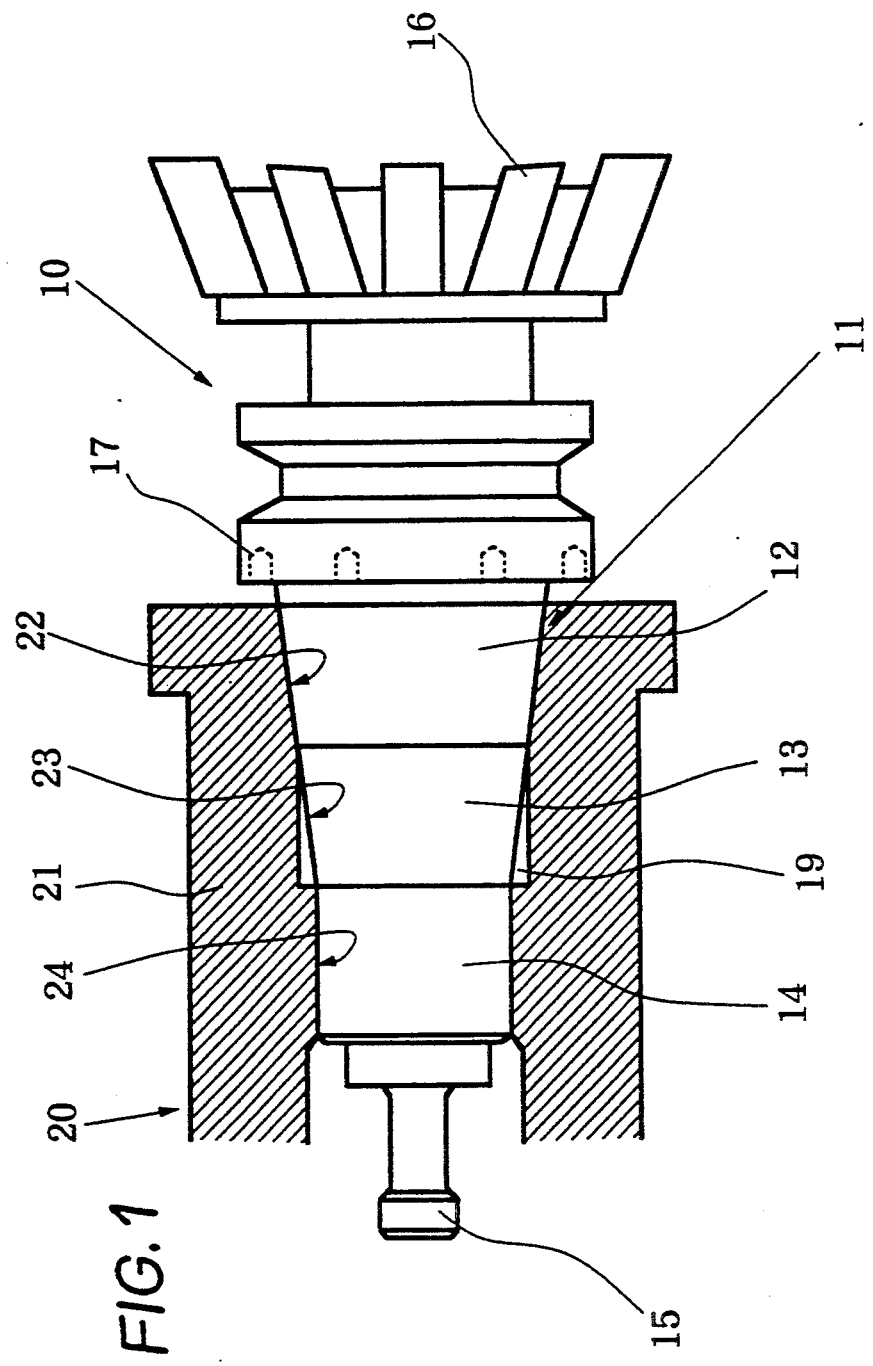
FIG. 1 is a sectional view showing a first embodiment of the invention.

FIG. 1 is a sectional view showing an embodiment of a tool holder coupling apparatus 1 according to the invention. A tool 16 is mounted at one end of a tool holder 10. A normal pull stud bolt 15 is attached at the other end of the tool holder 10. Between the tool 16 and the pull stud bolt 15 is a support portion to be supported by a machine spindle 21.

The support portion 11 is divided into three portions. The support portion 11 has a taper or short tapered portion 22 near the tool. The short tapered portion 22 is defined by a single continuous taper surface extending axially over approximately ⅓ of the axial length of the support portion 11. The support portion 11 includes a straight portion 14 near the pull stud bolt 15. The straight portion 14 is defined by a single cylindrical surface having approximately the same axial length as the short taper portion 12. The diameter of the straight portion 14 is smaller than the smallest diameter of the short taper portion 12. The support portion has a relief portion 13 between the short taper portion 12 and the straight portion 14. The relief portion 13 is defined by a single tapered surface. A step forms a discontinuity between the relief portion 13 and the short taper portion 12. The tool holder 10 has 6–8 balance holes 17.

A machine spindle 20 of, for instance, a machining center, has at its end a reception opening 21. At the back of the opening 21 are a conventional draw bar and a conventional collet chuck (not shown in the drawing).

The opening 21 has three portions. The reception opening 21 has a taper reception portion or short taper reception portion 22 formed at its outer end. The short taper reception portion 22 is defined by a tapered surface corresponding to that of the short taper portion 12. The short taper portion 12 of the tool holder engages the short taper reception portion 22 when the tool holder 10 is mounted in spindle 20. A middle portion 23 is formed adjacent to the short taper reception portion 22 and is located so as to correspond to the relief portion 13 of the tool holder. When the tool holder 10 is attached to the spindle 20, a gap 19 is formed between the middle portion 23 and the relief portion 13. A straight reception portion 24 is formed next to the middle portion 23. The straight reception portion 24 is defined by a cylindrical inner surface corresponding to the straight portion 14 of the tool holder so as to mate therewith.

When driven at a high speed of rotation and the taper reception portion 22 is enlarged, the tool holder 10 slides slightly toward the pull stud bolt 15 due to an interaction between the straight portion 14 of the tool holder and the straight reception portion 24 of the spindle. This relief, as it is called, allows the taper portion 12 of the tool holder to be closely supported on the taper reception portion 22 of the spindle. Therefore the tool holder 10 has hardly any play when driven at a high speed of rotation, thus enabling high accuracy in machining.

Figure 2:
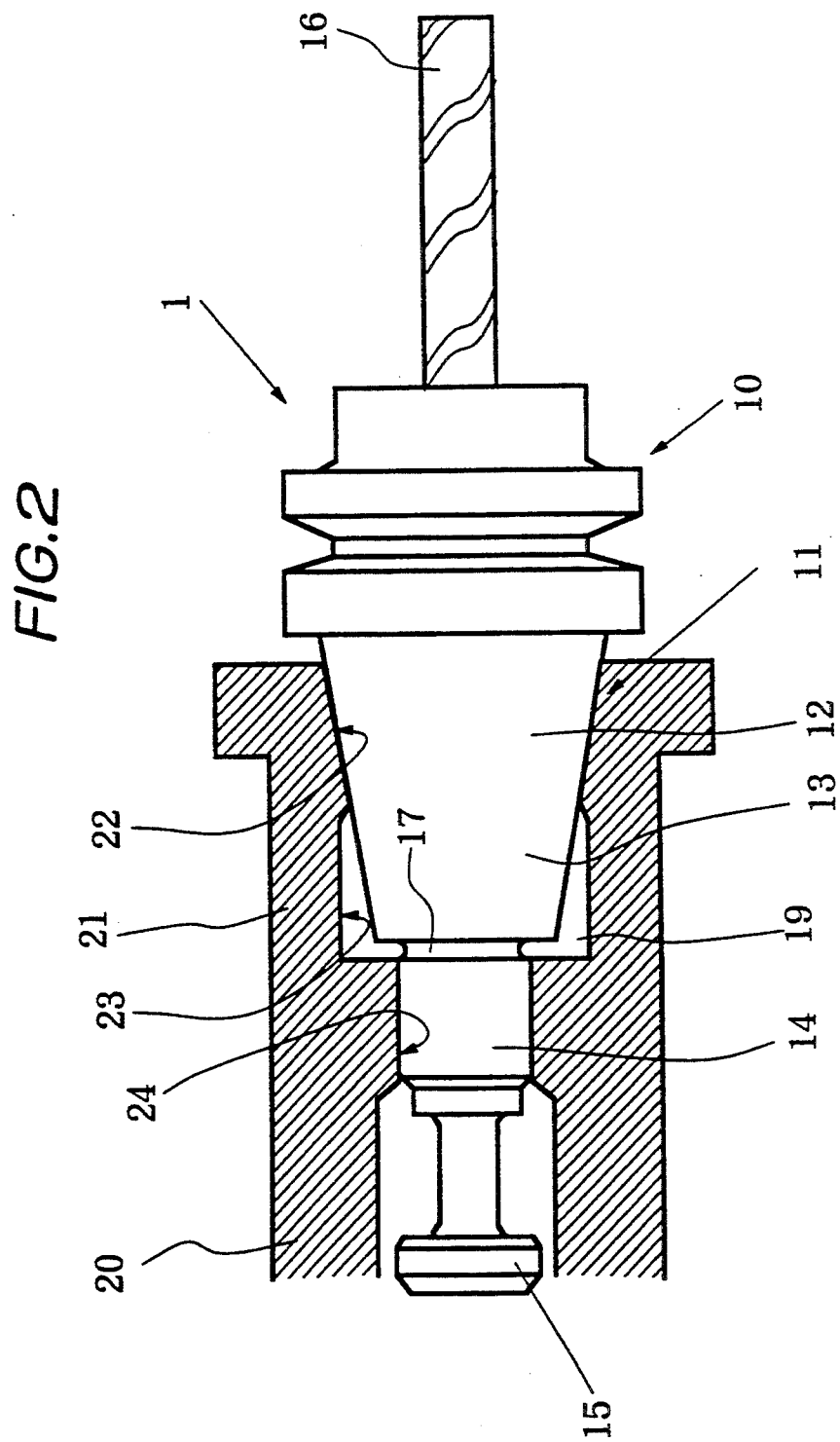
FIG. 2 is a sectional view showing a second embodiment of the invention.

A second embodiment of the invention is shown in FIG. 2. The only difference between the embodiments shown in FIGS. 1 and 2 is that in the embodiment of FIG. 2, the surface of the short taper portion 12 and that of the relief portion 13 of the tool holder 10 are defined by a common continuous tapered surface without any step. In the embodiment of FIG. 2 the area to be engaged by a short taper reception portion 22 is regarded as the short taper portion 12. Whereas an area corresponding to the middle portion 23 of the spindle is regarded as the relief portion 13. An annular channel 17 is formed between the relief portion 13 and the straight portion 14.

According to the tool holder coupling apparatus of the invention, when the spindle is driven at high speed of rotation and a gap forms between the taper reception portion of the spindle and the taper portion of the tool holder, the tool holder can slide slightly inwardly, i.e. toward the pull stud bolt 15. The straight portion of the tool holder accommodates such sliding movement. Because the taper portion of the tool holder is surely supported by the spindle, hardly any play of the tool occurs, and high accuracy machining can be performed. Because the taper portion of the tool holder closely fits the spindle, in heavy cutting high accuracy machining can be performed, thus improving productivity.

I claim:

1. A tool holder coupling apparatus comprising:
    a tool holder comprising a flange, a support section and a pull stud bolt, said support section having a tapered surface portion extending from a large diameter end to a small diameter end, a rigid, straight cylindrical portion of fixed diameter extending from the pull stud bolt toward the tapered surface portion and a relief portion contiguous with and connecting the tapered surface portion and the straight cylindrical portion, said tapered surface portion, said straight cylindrical portion and said relief portion being integrally formed as a single piece construction; and
    a machine spindle having a front end face and a central cavity for receiving said tool holder and including:
        an open distal end section having a first interior surface portion defining a first portion of said central cavity and having a taper corresponding to the taper of the tapered surface portion of the tool holder;
        a straight section having a straight cylindrical second interior surface portion corresponding to and slidably engaging the straight cylindrical surface portion of the tool holder and defining a second portion of said central cavity; and
        a middle section connecting said distal end section and said straight section, said middle section having a third interior surface portion defining a third portion of said central cavity, said third interior surface portion being spaced from said relief portion over the entire axial length of said relief portion with said tapered surface portion of said tool holder fully seated within said first interior surface portion of said machine spindle, wherein said tool holder, fully seated in said central cavity of said machine spindle, has a rear end face of said flange spaced from said front end face of said machine spindle and wherein said tool holder slides with respect to said machine spindle as speed of rotation of the machine spindle increases.

2. A tool holder coupling apparatus according to claim 1, wherein said tapered surface portion has approximately the same axial length as said relief portion.

3. A tool holder coupling apparatus according to claim 1, wherein said tapered surface portion has approximately the same axial length as said straight cylindrical portion.

4. A tool holder coupling apparatus according to claim 1, wherein said relief portion has approximately the same axial length as said straight cylindrical portion.

5. A tool holder coupling apparatus according to claim 1, wherein said straight cylindrical portion has a diameter smaller than the diameter of said small diameter end.

6. A tool holder coupling apparatus according to claim 1, wherein said relief portion has a tapered surface.

7. A tool holder coupling apparatus according to claim 6, wherein said tapered surface of said relief portion and the surface of said tapered surface portion together form a single, continuous surface of constant taper.

8. A tool holder coupling apparatus according to claim 6, wherein said tapered surface portion is separated from said relief portion by a step.

9. A tool holder coupling apparatus according to claim 1 wherein said third interior surface portion defines a straight cylindrical surface of said small diameter and forms a stepped cylindrical surface in conjunction with said second interior surface portion, said second interior surface portion having a diameter smaller than said small diameter.

* * * * *